106. COMPOSITIONS, COATING OR PLASTIC.

80

900,256

Examiner.

UNITED STATES PATENT OFFICE.

JAMES H. BATCHELDER, OF KEENE, NEW HAMPSHIRE.

COMPOSITION.

No. 900,256.    Specification of Letters Patent.    Patented Oct. 6, 1908.

Application filed May 5, 1908. Serial No. 431,027.

*To all whom it may concern:*

Be it known that I, JAMES H. BATCHELDER, citizen of the United States, residing at Keene, in the county of Cheshire and State of New Hampshire, have invented certain new and useful Improvements in a Composition, of which the following is a specification.

My invention relates to an improved composition and it has for its object the production of an impervious composition which may be employed as an effective lining for packages or wooden ware, and will protect the same from the action of the contents thereof.

Wooden packages when coated with my improved composition may be employed for the transportation of oils, paints, varnish, printing ink and pickles, and such packages thereby rendered impervious to the action of their contents. I have also found that my improved composition may be used as an adhesive, and a substitute for glue, paste and mucilage in the various uses in which the same are employed.

My improved composition is free from odor or taste and the same will not sour or deteriorate and may therefore be kept for an indefinite period before using.

My composition may be made either of a liquid or semi-liquid consistency, according to the use for which it is desired to employ the same.

To these ends my composition consists of the ingredients assembled in the manner and in the preferred proportions which will now be described.

In the preparation of a predetermined quantity of my composition I employ the following ingredients preferably in about the relative proportions enumerated: silicate of soda eight pounds; one quarter of a pound of dextrin; one-quarter of a pound of molasses; one quarter of a pound of glycerin, and a sufficient quantity of powdered silica to act as a filler. The dextrin is mixed and thinned with water and the molasses and glycerin added. The resulting mixture is then added to the silicate of soda, and powdered silica, which latter acts as a filler.

I have found that in coating the interior of wooden pails and packages or other form of wooden packages with my improved composition the contents thereof is preserved from any deleterious action of the wood thereof, and at the same time the wood from which the package is made is preserved from injurious action by the contents of such package, and all leakage is prevented. I have also found that my improved composition when made in semi-liquid or paste form may be employed as an adhesive or substitute for glue and, as stated, is free from any objectionable taste or odor, and does not therefore require the addition of any scenting or perfuming medium thereto such as is usually added to paste or mucilage employed for office or desk purposes.

I do not wish it to be understood that it is my intention to limit the various uses to which my improved composition may be put by the foregoing enumeration of some of the uses to which the same may be successfully applied, as I realize that there are numerous purposes for which the same may be utilized with advantage.

Having thus described my invention what I claim as new and desire to secure by Letters Patent is—

1. A composition of matter comprising silicate of soda, dextrin, molasses, glycerin and water.

2. A composition of matter comprising silicate of soda, silica, dextrin, molasses, glycerin and water.

In testimony whereof I affix my signature in presence of two witnesses.

JAMES H. BATCHELDER.

Witnesses:
FRANK A. MATTHEWS,
JUDSON A. REYNOLDS.

Lennig, 653,101, July 3, 1900 (134-49),

Randolph, 668,565, February 19, 1901 (134-16),

Häckel (British) 20,528, 1900 (87-Adhesives),

Besele (German) 61,703, 1892 (87-Adhesives).